(12) United States Patent
Yao et al.

(10) Patent No.: US 9,369,275 B2
(45) Date of Patent: *Jun. 14, 2016

(54) KEY AGREEMENT IN WIRELESS NETWORKS WITH ACTIVE ADVERSARIES

(71) Applicants: CALIFORNIA INSTITUTE OF TECHNOLOGY, Pasadena, CA (US); PURDUE RESEARCH FOUNDATION, West Lafayette, IN (US)

(72) Inventors: Hongyi Yao, Pasadena, CA (US); Tracey C. Ho, Pasadena, CA (US); Cristina Nita-Rotaru, Chicago, IL (US)

(73) Assignees: CALIFORNIA INSTITUTE OF TECHNOLOGY, Pasadena, CA (US); PURDUE RESEARCH FOUNDATION, West Lafayette, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/696,304

(22) Filed: Apr. 24, 2015

(65) Prior Publication Data

US 2015/0288516 A1    Oct. 8, 2015

Related U.S. Application Data

(63) Continuation of application No. 13/853,881, filed on Mar. 29, 2013, now Pat. No. 9,130,742.

(60) Provisional application No. 61/618,203, filed on Mar. 30, 2012.

(51) Int. Cl.
  *H04L 29/06* (2006.01)
  *H04L 9/08* (2006.01)
  *H04W 12/04* (2009.01)

(52) U.S. Cl.
  CPC ............ *H04L 9/0827* (2013.01); *H04L 9/0802* (2013.01); *H04W 12/04* (2013.01); *H04L 2209/34* (2013.01); *H04L 2209/80* (2013.01)

(58) Field of Classification Search
  CPC ............ H04L 2209/34; H04L 2209/80; H04L 9/0802; H04L 9/0827
  See application file for complete search history.

(56) References Cited

U.S. PATENT DOCUMENTS

| 5,452,328 | A | 9/1995 | Rice |
| 6,182,214 | B1 * | 1/2001 | Hardjono ............... H04L 9/085 380/255 |
| 7,123,719 | B2 * | 10/2006 | Sowa .................... H04L 9/0822 380/247 |
| 7,203,871 | B2 | 4/2007 | Turner et al. |
| 7,581,156 | B2 | 8/2009 | Manasse |

(Continued)

OTHER PUBLICATIONS

R. Blom. An optimal class of symmetric key generation systems. *Advances in Cryptology: Proceedings of Eurocrypt '84*. Lecture Notes in Computer Science, vol. 209, Springer, Berlin, 1985, 335-338.

(Continued)

*Primary Examiner* — Chau Le
(74) *Attorney, Agent, or Firm* — Steinfl & Bruno LLP

(57) ABSTRACT

A network and related methods for transmitting processes in a network secretly and securely is described. The network use keys, through path-key establishment and a key pool bootstrapping, to ensure that packets are transmitted and received properly and secretly in the presence of one or more adversarial nodes.

5 Claims, 5 Drawing Sheets

(56) References Cited

U.S. PATENT DOCUMENTS

| | | | |
|---|---|---|---|
| 7,818,607 B2 | 10/2010 | Turner et al. | |
| 7,924,906 B2 | 4/2011 | Rice | |
| 7,958,426 B2 | 6/2011 | Betts | |
| 8,069,388 B2 | 11/2011 | Betts | |
| 8,311,096 B2 | 11/2012 | Rusch-Ihwe | |
| 8,381,024 B2 | 2/2013 | Turner et al. | |
| 8,522,122 B2 | 8/2013 | Alves et al. | |
| 2003/0076959 A1* | 4/2003 | Chui | H04K 1/00 380/277 |
| 2005/0140964 A1* | 6/2005 | Eschenauer | H04L 63/1408 356/10 |
| 2006/0136713 A1* | 6/2006 | Zimmer | H04L 63/0428 713/150 |
| 2007/0277035 A1* | 11/2007 | Patel | H04L 9/0822 713/168 |
| 2009/0046854 A1* | 2/2009 | Di Crescenzo | H04L 9/002 380/44 |
| 2011/0010538 A1* | 1/2011 | Falk | H04L 63/06 713/155 |
| 2012/0300939 A1* | 11/2012 | Du | H04L 63/061 380/279 |

OTHER PUBLICATIONS

H. Chan et al. PIKE: Peer intermediaries for key establishment in sensor networks. *IN-FOCOM 2005. 24$^{th}$ Annual Joint Conference of the IEEE Computer and Communications Societies Proceedings IEEE*, vol. 1. IEEE, 524-535. Conference date Mar. 13-17, 2005.

R. Di Pietro et al. Random key-assignment for secure wireless sensor networks. SASN 2003 *Proceedings of the 1$^{st}$ ACM workshop on Security of ad hoc and sensor networks*, ACM, 62-71.

L. Eschenauer et al. A key-management scheme for distributed sensor networks. CCS 2002 *Proceedings of the 9$^{th}$ ACM conference on Computer and communications security*. ACM, 41-47.

H. Yao et al. Key agreement for wireless networks in the presence of active adversaries. *in Proc. IEEE Asilomar Conf. on Signals, Sys. and Comp.*, 2011. 6 pages.

Non-Final Office Action issued on Feb. 20, 2015 for U.S. Appl. No. 13/853,857, filed Mar. 29, 2013 in the name of California Institute of Technology.

* cited by examiner

Step 1: generating a source message to be transmitted from a source node to a receiver node.

Step 2: generating one or more random packets independently and uniformly within the source node.

Step 3: generating a distinct encoded source file for each intermediate node in the network, the encoded source file comprising a linear combination of the source message, the one or more random packets and corresponding error detection code.

Step 4: Forwarding each of the distinct encoded source files to each corresponding intermediate node via intermediate transmission links.

Step 5: Forwarding each of the distinct encoded source files, upon request by the receiver node, from the corresponding intermediate node to the receiver node.

Step 6: Decoding the source message from the plurality of encoded source files.

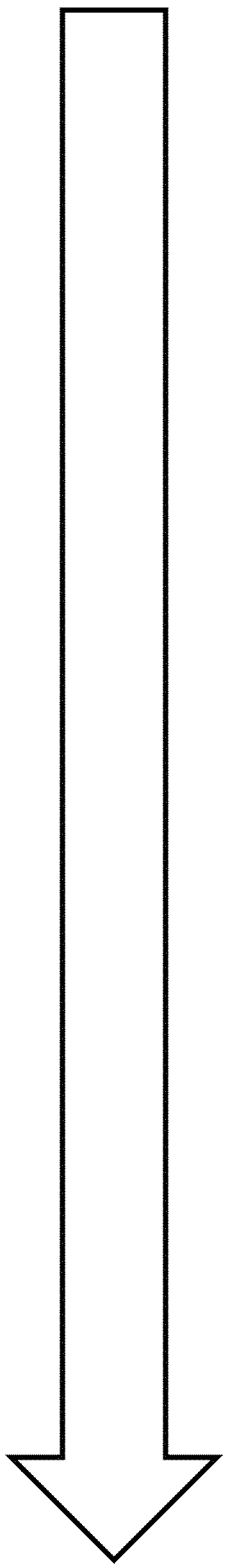

FIG. 2

KEY AGREEMENT IN WIRELESS NETWORKS WITH ACTIVE ADVERSARIES

CROSS REFERENCE TO RELATED APPLICATIONS

The present application is a Continuation of U.S. application Ser. No. 13/853,881, now U.S. Pat. No. 9,130,742, filed on Mar. 29, 2013, incorporated herein by reference in its entirety, which, in turn, claims priority to U.S. Provisional Application No. 61/618,203 filed on Mar. 30, 2012 and incorporated herein by reference in its entirety.

STATEMENT OF GOVERNMENT GRANT

This invention was made with government support under FA9550-10-1-0166 awarded by the Air Force and CNS0905615 & CNS0905266 awarded by the National Science Foundation. The government has certain rights in the Invention.

FIELD

The present application is directed to information theoretic network error correction codes for networks (e.g. wireless networks).

BACKGROUND

The present disclosure relates to networks and methods related to the field of error correction codes which are covered in various areas such as information theory, coding theory and communication theory, with applications in computer science and telecommunication. In particular, the present disclosure presents a novel construction for error correcting codes with respect to robust distribution of secret keys when one or more subset of nodes within a network are corrupted or untrustworthy.

SUMMARY

According to a first aspect of the present disclosure, a computer-based network with error correction code is provided, the computer-based network configured to transmit keys secretly and securely by: encoding a key on a first single computer-based workstation, forwarding a plurality of encoded files via a plurality of computer-based workstations, and decoding the plurality of encoded files on a second single computer-based workstation using a decoding algorithm to retrieve the key.

According to a second aspect of the present disclosure, a computer-based network with error correction code is provided, the computer-based network configured to transmit a key pool secretly and securely by: dividing a key pool into a plurality of individual keys, forwarding the plurality of individual keys to one or more computer-based workstations within a plurality of computer-based workstations to be encoded such that a particular computer-based workstation within the plurality of computer-based workstations receives one or more of the individual keys of the key pool but less than all of the individual keys of the key pool, encoding, within each computer-based workstation of the plurality of computer-based workstations, received individual keys to be forwarded upon request to a single computer-based workstation, and decoding a plurality of encoded keys on the single computer-based workstation using a decoding algorithm to retrieve a specified subset of the key pool.

According to a third aspect of the present disclosure, a computer-based method for transmitting a key secretly and securely over a network, the network comprising a plurality of computer-based intermediate nodes configured to transmit the key from a computer-based source node to a computer-based receiver node is provided, the method comprising: providing a first computer-based workstation operating as a source node and configured to encode a key and forward, via a first plurality of intermediate transmission links, a distinct encoded file for each intermediate node within a plurality of intermediate nodes of the network, providing a plurality of computer-based workstations operating as intermediate nodes and configured to receive, via the first plurality of intermediate transmission links, the encoded files from the source node and forward, via a second plurality of intermediate transmission links, the encoded files to a receiver node when requested, and providing a second computer-based workstation operating as the receiver node and configured to receive, via the second plurality of intermediate transmission links, encoded files from the plurality of intermediate nodes and decode the encoded files to retrieve the key, wherein a particular intermediate node, with corresponding intermediate transmission links from the first and second plurality of intermediate transmission links, forms a two-hop path between the source node and the receiver node, and wherein one or more of the encoded files received by the receiver node may be erroneous due to an erroneous intermediate transmission link and/or an erroneous intermediate node.

According to a fourth aspect of the present disclosure, a computer-based method for transmitting a key pool secretly and securely over a network, the network comprising a plurality of computer-based intermediate nodes configured to transmit a plurality of individual keys of the key pool to a single computer-based receiver node is described, the method comprising: providing a first plurality of computer-based workstations operating as a plurality of source nodes, each computer-based workstation of the first plurality of computer-based workstations corresponds to an individual key of a key pool and configured to forward the corresponding individual key, via a first plurality of intermediate transmission links, to one or more intermediate nodes within the plurality of intermediate nodes such that a particular intermediate node can have one or more of the individual keys but not all of the individual keys of the key pool, providing a plurality of computer-based workstations operating as a plurality of intermediate nodes, each intermediate node is configured to receive, via the first plurality of intermediate transmission links, one or more of the individual keys but not all of the individual keys of the key pool, to encode the one or more received individual keys of the key pool and to forward, via a second plurality of intermediate transmission links, encoded keys to a receiver node when requested, and providing a computer-based workstation operating as the receiver node and configured to receive, via the second plurality of intermediate transmission links, encoded keys from the plurality of intermediate nodes and decode the encoded keys to retrieve the key pool, wherein one or more of the encoded keys received by the receiver node may be erroneous due to an erroneous intermediate transmission link and/or an erroneous intermediate node.

BRIEF DESCRIPTION OF THE DRAWINGS

FIG. 2 illustrates a flowchart detailing the path key establishment.

DETAILED DESCRIPTION

Embodiments of the present disclosure aim to prevent one or more corrupted or untrustworthy intermediate nodes (also referred to as relay nodes) from executing adversarial eavesdropping or corruption attacks in a network (e.g. a distributed wireless network) on key agreement processes. Key agreements are used to set up links between nodes (e.g. source, receiver and intermediate) in a network that are both secure and secret. Such aim is provided by using a method identified as path key establishment whereby a plurality of transmissions are provided over node-disjoint paths in the network to robustly and securely establish a shared key between a source node and a receiver node. In addition, key agreements can utilize another method whereby nodes may acquire some subset of keys from neighboring nodes (aka bootstrapping) in the network to minimize overhead of redundant transmissions from the source node in the network. Both the above methods are described generally in this present disclosure but are more detailed in the enclosed Annex 1, which is part of the present disclosure. Annex 2 is also being included to provide further detail pertaining to the path-key establishment method and therefore also part of the present disclosure.

Path-Key Establishment

As stated above, an aim for key agreement in a wireless network with active adversaries is to ensure that messages, in particular keys, sent by a source node can be transmitted to a receiver node both reliably and secretly. Path key establishment is one method which facilitates the secure and secret transmission of the message between nodes of a network.

Figure 1:
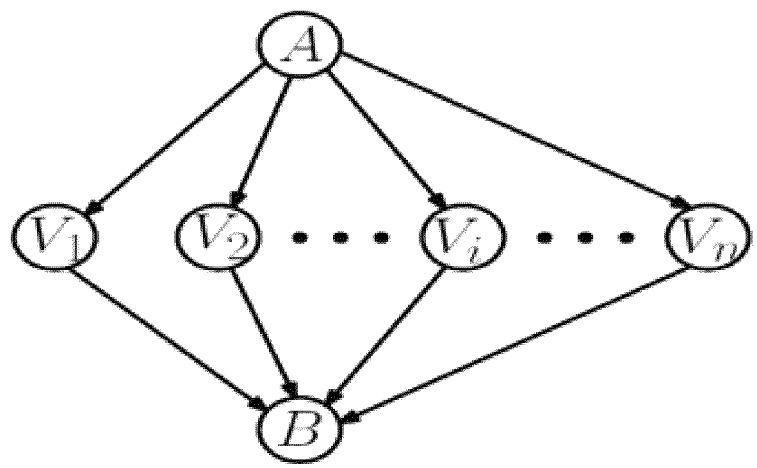
FIG. 1 illustrates a model for path key establishment method.

FIG. 1 illustrates a model for path-key establishment. In particular, the model shows one source node A, one receiver node B and a plurality of intermediate nodes ($V_1, V_2 \ldots V_i \ldots V_n$). Each of the plurality of intermediate nodes ($V_1, V_2 \ldots V_i \ldots V_n$) are connected to the one source node A via a plurality of corresponding input links and are also connected to the one receiver node B via a plurality of corresponding output links thereby creating a plurality of two-hop paths (multi-hop network) between the source node A and the receiver node B.

With the path key establishment method, the source node A and receiver node B desire to establish a secure channel without the use of a priori shared secret key. To achieve such a condition, the source node A and receiver node B establish a secret key by communicating over existing secure channels in the multi-hop network. Further detailed explanation pertaining to the benefits of this first method over the prior use of shared secret keys is provided in Section I ('Introduction') of Annex 1 and Section 1 ('Introduction') of Annex 2.

An assumption used within the embodiment of the present disclosure is that a number of compromised nodes (z) within the plurality of intermediate nodes ($V_1, V_2 \ldots V_i \ldots V_n$) would need to be less than or equal to a lower bound wherein the lower bound is related to a number of available intermediate nodes (n) within the network. If such a condition is present in the network, the source node A could transmit to receiver node B secretly and securely. If such a condition is not present in the network (i.e. if the number of compromised nodes (z) within the plurality of intermediate nodes ($V_1, V_2 \ldots V_i \ldots V_n$) is greater than the lower bound), then the source node A may not be able to transmit reliably and securely to the receiver node B. Further detail pertaining to the conditions for transmissions is provided under section II ('Path-Key Establishment), Theorem 1 of Annex 1.

With respect to the prior art, the source node A could include hash checks with a plurality of message parts transmitted to the plurality of intermediate nodes ($V_1, V_2 \ldots V_i \ldots V_n$). Such hash checks (a form of error detection) would be received by the receiver node B to ensure that a particular message part is correct. However, such implementation does not ensure the secrecy and security of the plurality of message parts sent through the network. Further detail is provided under section II, Theorem 1 of Annex 1 and section 4.2 ('Coding Technique') of Annex 2.

Reference now turns to FIG. 2 which provides an overview of the path key establishment (see, steps 1-6 of FIG. 2). With an embodiment of the present disclosure, the above lack of secrecy and security is resolved through the use of keys being generated and transmitted. The source node A independently and uniformly generates one or more random packets to be linearly combined with each of the plurality of message parts (comprising the keys) and hash checks (error detection code). The linear combination of the random packets, message parts and hack checks form a plurality of packets to be transmitted to the plurality of intermediate nodes. Further detail pertaining to the operation of the source node A is provided in section II, sub-section C ('Our Construction for Secrecy and Error Correction—Encoder at node A') of Annex 1 and section 4.2, Encoder at node A, of Annex 2.

With respect to the receiver node B, the plurality of packets to be transmitted from the source node A are received at the receiver node B after being requested from the plurality of intermediate nodes. Much like the prior art, the hash checks are used to provided error detection to ensure that a particular message part was transmitted correctly. However, with the addition of the independently and uniformly generated random packets that are linearly combined with the plurality of message parts, receiver node B can be sure that the message parts are secret under certain conditions. Further detail pertaining to the operation of the receiver node B is provided in section II, sub-section C ('Our Construction for Secrecy and Error Correction—'Decoder at node B') of Annex 1 and section 4.2, Decoder at node B, of Annex 2. Additional information pertaining to how the use of keys ensures security and secrecy is provided under section II, Theorem 2 of Annex 1 and section 4.2, Theorem 4.2 of Annex 2.

The above disclosure details an embodiment of the network where the source node A generates, encodes and forwards the key to be received by the receiver node B. In the following section, a different method for establishing secret keys, referred to as key pool bootstrapping, is described.

Key Pool Bootstrapping

A general overview of the method of key pool bootstrapping is provided below. Detailed descriptions of the method are provided in Section III ('Key Pool Bootstrapping') of Annex 1. In particular, the method of key pool bootstrapping pertains to a recursive transmission of a subset of keys belonging to a key pool which was generated by a key center.

Figure 3A:
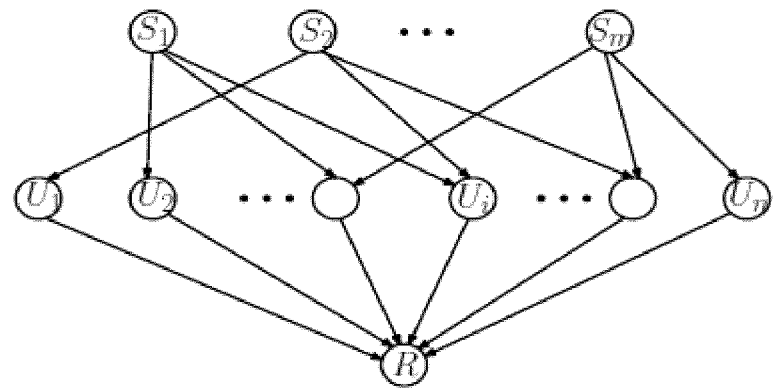
FIGS. 3A-3D illustrate examples of key pool bootstrapping.

Reference is made now to FIG. 3A illustrating a network model for key pool bootstrapping. The key pool, as stated above, is generated by a key center. To ensure that no intermediate node (identified as nodes $U_1 \ldots U_n$) possesses the entire key pool, thereby ensuring security from potential adversary nodes, each of these intermediate nodes receive a subset of the keys from the key pool. Further detail is provided under section III, sub-section A ('Problem Formulation') of Annex 1.

As shown in FIG. 3A, all of the intermediate nodes receive a subset of keys directly from the key center. However, in another embodiment not shown in FIG. 3A, it is possible that only some of the intermediate nodes receive keys directly from the key center. The rest of the intermediate nodes would be configured to receive keys from the intermediate nodes that have previously received their keys. FIG. 3A does not illustrate the presence of the intermediate nodes which would obtain their keys from other intermediate nodes and corresponding lateral links between the two sets of intermediate nodes (e.g. those intermediate nodes with keys and those request keys). However, the method whereby the intermediate nodes acquire keys from other intermediate nodes is similar to the method by which the receiver node (R) of FIG. 3A acquires the key pool from all intermediate nodes ($U_1 \ldots U_n$) described below.

Figure 3B:
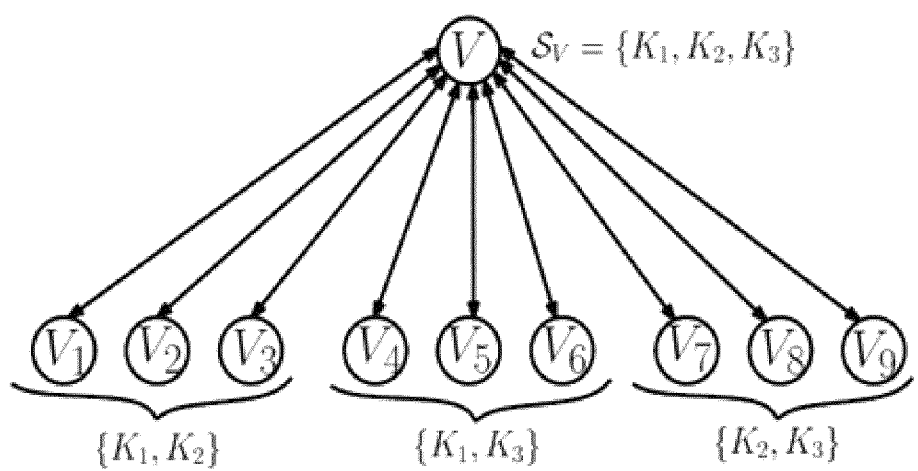

With respect to the receiver node (R) in FIG. 3A, such node acquires its keys in a recursive manner from intermediate nodes ($U_1 \ldots U_n$) that received their own subset of keys from the key center. FIG. 3B illustrates an overview of key pool bootstrapping whereby a receiver node (V) acquires a specific set of keys (indicated as a set of keys $K_1$, $K_2$ and $K_3$) from a plurality of intermediate nodes ($V_1 \ldots V_9$) each containing a subset of the key pool (e.g. $K_1$ and $K_2$ only). Further detail is provided under section III, sub-section B ('Connection between Multi-source Network Error correction Coding and Key Pool Bootstrapping') and sub-section C ('Multi-source Network Error correction Codes for Key Pool Bootstrapping') of Annex 1.

Figure 3C:
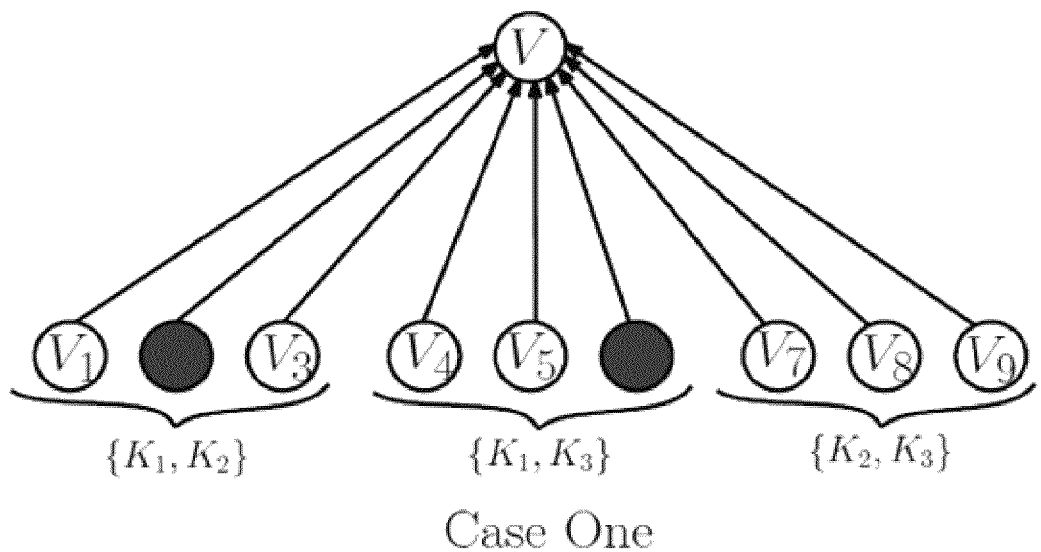
Figure 3D:
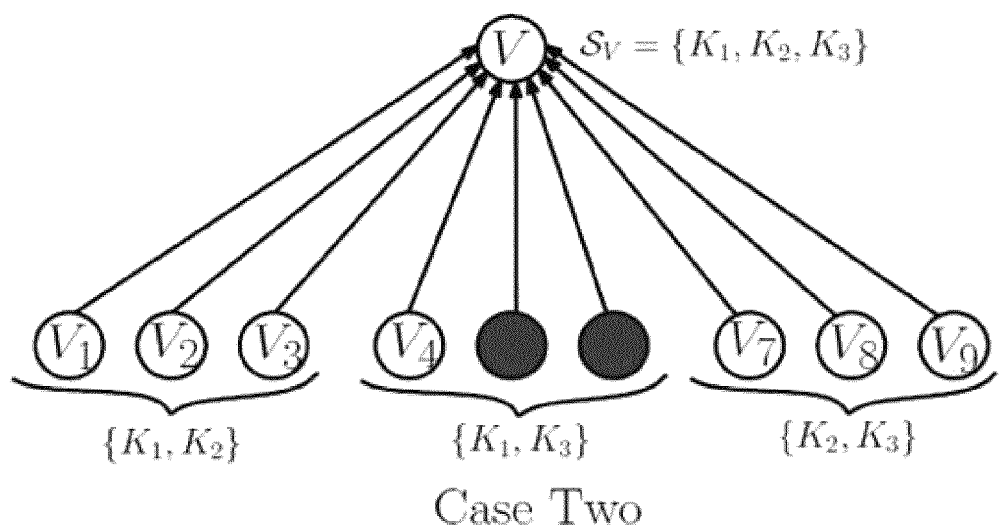

FIGS. 3C and 3D illustrate examples where one or more intermediate nodes being accessed by the receiver node (V) are compromised (indicated by a filled blacked node). However, in such a situation, even if the identities of compromised nodes are unknown it is still possible that the subset of keys can still be retrieved based on the combined information received from the other non-compromised intermediate nodes, through the application of network error correction coding, which also provides a characterization of the number of compromised nodes that can be tolerated given the total number of nodes and the subsets of keys that they hold. Additional information relating to error correction for key pool bootstrapping is provided under section III, sub-section C of Annex 1.

Figure 4:
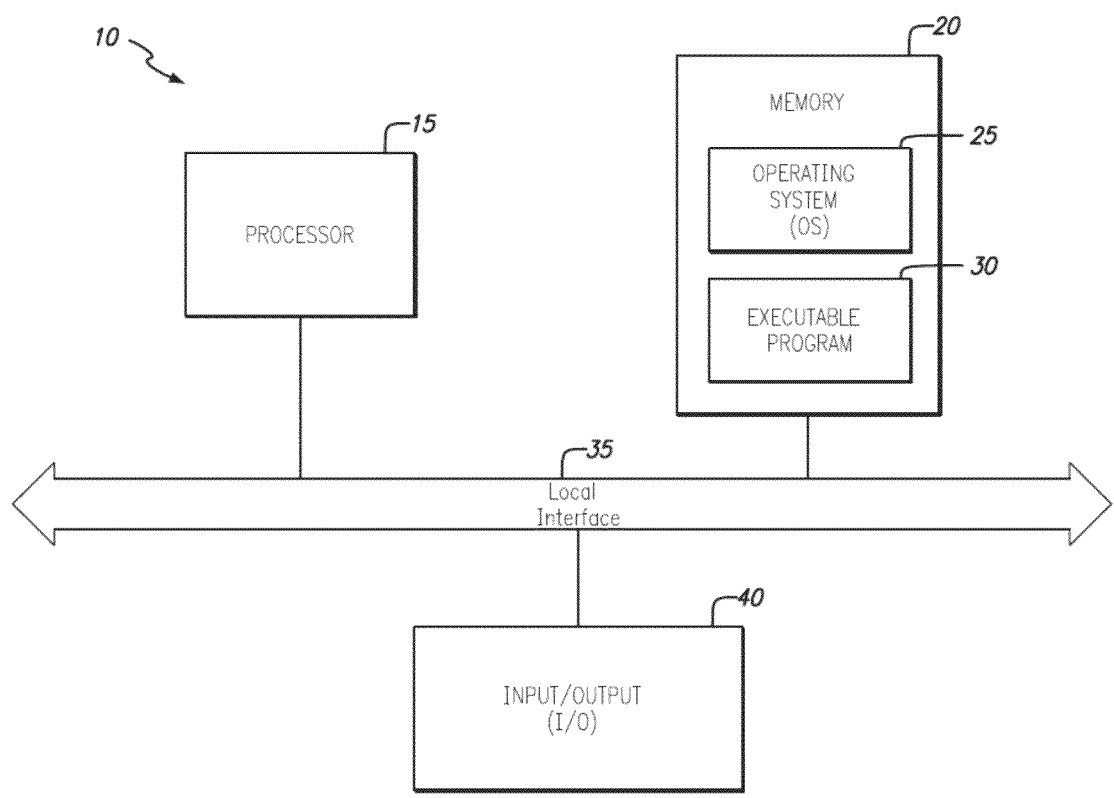
FIG. 4 illustrates a system that may be used to implement the key agreement methods of the present invention

FIG. 4 is an exemplary embodiment of a system (10) (e.g. a computer system, workstation) for implementing the key agreement methods described above. In particular, the system can be implemented in one or more of the plurality of nodes (i.e. source, receiver and/or intermediate) of the networks described above. The system, as seen in FIG. 4, comprise a processor (15), memory (20), a local interface (35) and one or more input and/or output (I/O) devices (40). The processor (15) may execute one or more instructions related to the implementation of the key agreement methods described above and as provided by the operating system (OS) (25) based on some executable program stored in the memory (20). These instructions are carried to the processors (20) via the local interface (35) and as dictated by some data interface protocol specific to the local interface and the processor (15). It should be noted that the local interface (35) is a symbolic representation of several elements such as controllers, buffers (caches), drivers, repeaters and receivers that are generally directed at providing address, control, and/or data connections between multiple elements of a processor based system. In some embodiments the processor (15) may be fitted with some local memory (cache) where it can store some of the instructions to be performed for some added execution speed. Execution of the instructions by the processor may require usage of some input/output device (40), such as inputting data from a file stored on a hard disk, inputting commands from a keyboard, outputting data to a display, or outputting data to a USB flash drive. In some embodiments, the operating system (25) facilitates these tasks by being the central element to gathering the various data and instructions required for the execution of the program and provide these to the microprocessor. In some embodiments the operating system may not exist, and all the tasks are under direct control of the processor (15), although the basic architecture of the target hardware device (10) will remain the same as depicted in FIG. 4. In some embodiments, a plurality of processors may be used in a parallel configuration for added execution speed. In such a case, the executable program may be specifically tailored to a parallel execution. Also, in some embodiments the processor (15) may execute part of the key agreement methods described above and some other parts may be implemented using dedicated hardware/firmware placed at an I/O location accessible by the system (10) via a local interface (35). The system (10) may include a plurality of executable programs (30), wherein each may run independently or in combination with one another.

The examples set forth above are provided to give those of ordinary skill in the art a complete disclosure and description of methods pertaining to key agreement for wireless networks with active adversaries, and are not intended to limit the scope of what the inventors regard as their disclosure. The skilled person may find other suitable implementations of the presented embodiments.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a", "an", and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications can be made without departing from the spirit and scope of the present disclosure. Accordingly, other embodiments are within the scope of the following claims.

The invention claimed is:

1. A network of computers with error correction code configured to transmit keys secretly and securely comprising:
   a first computer-based workstation operating as a source node and configured to encode a key into a plurality of distinct encoded source files, encoding being operatively implemented in one of: a) hardware, b) software, and c) a combination of a) and b);
   a plurality of computer-based workstations operating as a plurality of intermediate nodes and configured to each receive a distinct encoded source file of the plurality of distinct encoded source files and transmit, to a receiver node, the distinct encoded source file when requested by the receiver; and a second computer-based workstation operating as the receiver node and configured to decode the plurality of distinct encoded source files and retrieve the key, decoding being operatively implemented in one of: a) hardware, b) and/or software, and c) a combination of a) and b);

wherein the encoding, transmitting and decoding of the key comprise the following steps:

generating the key to be transmitted from the source node to the receiver node, generating one or more random packets independently and uniformly within the source node, generating a distinct encoded file for each intermediate node in the network, the encoded file comprising a linear combination of the key, the one or more random packets that were independently and uniformly generated and corresponding error detection information, forwarding each of the distinct encoded files generated by the source node to each corresponding intermediate node of the plurality of intermediate nodes within the network via a first plurality of intermediate transmission links, forwarding each of the distinct encoded files, upon request by the receiver node, from the corresponding intermediate node via a second plurality of intermediate transmission links, and decoding the key from the plurality of encoded files, the error detection information used to determine if an error was present in either the intermediate transmission link and/or the intermediate node for a particular encoded file.

2. The network of computers of claim 1, wherein the encoded source files comprise linearly independent combinations of the following:

one or more randomly generated packets, and a source message, the source message comprising a set or subset of keys and corresponding error detection information.

3. The network of computers of claim 2, wherein the error detection information comprises hash information from each of the other encoded files, the hash information being defined in terms of random parameters generated by the source node.

4. The network of computers of claim 1, wherein the network is a distributed wireless network.

5. A network of computers with error correction code configured to transmit a key pool secretly and securely comprising:

(i) a plurality of computer-based workstations operating as a plurality of intermediate nodes and configured to each:

receive one or more, but not all, individual keys of the key pool, the key pool comprising a plurality of individual keys, encode the one or more individual keys, encoding being operatively implemented in one of: a) hardware, b) software, and c) a combination of hardware and software, and transmit the encoded one or more individual keys to a receiver node, when requested; and (ii) a computer-based workstation operating as the receiver node and configured to decode encoded one or more individual keys received from a subset of the intermediate nodes, using a decoding algorithm to retrieve a specified subset of the key pool, decoding being operatively implemented in one of: a) hardware, b) software, and c) a combination of hardware and software;

wherein the decoding of the encoded keys to retrieve, the key pool in the receiver node comprises the following steps:

identifying two or more distinct groupings of intermediate nodes of the plurality of nodes, wherein each intermediate node within a particular distinct grouping of intermediate nodes shares a same set of individual keys of the key pool, requesting each of the intermediate nodes of the two or more distinct groupings of intermediate nodes to forward their respective encoded files, using error detection information to identify a number of compromised nodes within the two or more distinct grouping of intermediate nodes, decoding each of the encoded files forwarded by each of the intermediate nodes, determining a number of consistent decoded keys forwarded by the intermediate nodes within a particular grouping of the two or more distinct groupings of intermediate nodes, the number of consistent decoded keys is based on the number of compromised nodes, and extracting the key pool by retrieving an error-free subset of the key pool from each of two or more distinct grouping of intermediate nodes.

* * * * *